March 26, 1957     C. C. STUART     2,786,563

SKID SUPPORT

Filed May 28, 1954

INVENTOR.
CLARENCE C. STUART
BY
Barnes, Kisselle, Laughlin & Raisch
ATTORNEYS.

United States Patent Office 2,786,563
Patented Mar. 26, 1957

2,786,563

SKID SUPPORT

Clarence C. Stuart, Dearborn, Mich., assignor to Traffic Transport Engineering, Inc., Dearborn, Mich., a corporation of Michigan Application May 28, 1954, Serial No. 433,223

8 Claims. (Cl. 193—41)

This invention relates to a skid support and has more particularly to do with a support of the type used for supporting the hinged ends of skids employed for loading automobiles on carriers or transports.

Automobiles of the design which emphasize a relatively long wheel base and a reduced ground clearance present a serious problem in connection with loading such automobiles on motor car carriers of the trailer type. The conventional practice is to provide two skids from the ground to the rear end of the track on the motor car carrier, each skid comprising two pivotally connected sections. A skid support is arranged beneath the pivotal connection on each skid. With some types of automobiles it is impossible to control the height of the skid support to a fixed value and attain the necessary clearance required for driving the automobile up the skid, over the skid support, and down over the end of the skid on to the track of the motor car carrier. Experience has shown that with some cars if the support is adjusted vertically so that the two sections of the skid approach a straight line, then the inclination of the uppermost skid section is so great as to cause interference between the track on the motor car carrier and the lower edge portions of the automobile body when the car is driven over the skid and on to the track on the motor car carrier. On the other hand, if the skid is raised so that the uppermost skid section is more nearly horizontal, then the car drags at the skid support or the rear end of the car drags on the ground as the front wheels of the car travel up the lowermost skid section.

It is an object of this invention to provide a self-regulating skid support, a skid support which automatically regulates the height of the pivotal connection between the skid sections in accordance with the clearance required at the various stages of driving a car over the skids and on to the track of the motor carrier.

Figure 1:
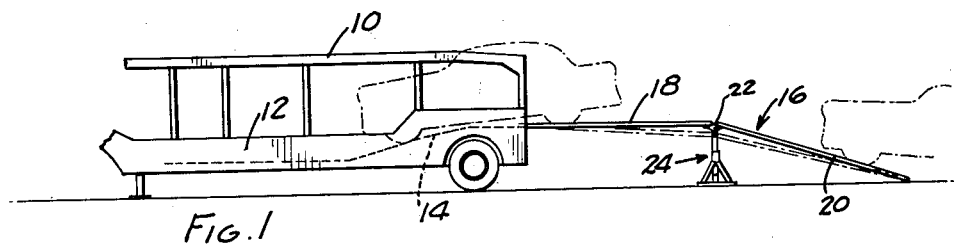
Fig. 1 is a view showing a skid extending from a ground surface to the track at the rear end of a motor car carrier and supported by a skid support of this invention.

In Fig. 1 there is shown a motor car carrier in the form of a trailer 10 having a track 12 on which automobiles are arranged to be secured. The track 12 has a portion 14 adjacent the rear end of trailer 10 which inclines upwardly as shown so as to clear the axle of the trailer. For loading cars on track 12 of the trailer there is provided a pair of skids 16 each of which comprises two sections 18 and 20 which are pivotally connected at their adjacent ends as by a hinge assembly 22.

A skid support generally designated 24 is utilized for supporting the hinge assembly 22 in an elevated position so that the skid sections 18 and 20 assume the proper or desired inclination with respect to the horizontal.

Support 24 includes a base 26 on which is secured, as by welding, an upright tubular support 28. Brackets 30 provide reinforcement and lateral stability for the member 28. Within tubular support 28 there is telescopically arranged a second vertically extending support 30. A coil compression spring 32 is arranged between the lower end of support 30 and a pin 34 which is removably mounted on support 28. Support 28 is provided with a plurality of pairs of vertically spaced openings 36 in which the pin 34 may be selectively inserted to thereby support the lower end of spring 32. Pin 34 may be more or less permanently connected with the support 28 by a chain 38. If desired, spring 32 may be connected at its upper end with the lower end of support 30 as by the lugs 40 at the lower end of support 30 which are bent over the uppermost convolution of spring 32.

At its upper end the support 30 is provided with a bracket 42 having aligned holes 44 for pivotally supporting the hinge assembly 22 which pivotally connects the two track sections 18 and 20. The maximum extent to which the member 30 can move upwardly or outwardly with respect to the support 28 is controlled by a chain 46 which is connected at its opposite ends to the members 28 and 30 as illustrated.

Figure 2:
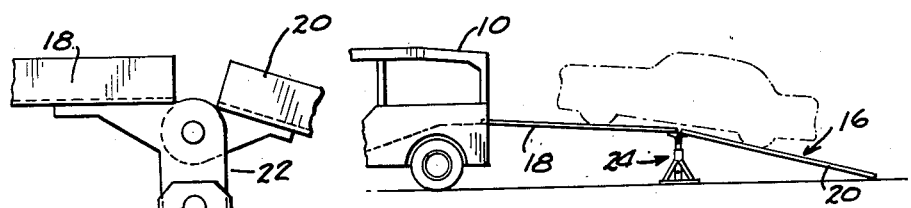
Fig. 2 is a view similar to Fig. 1 and showing the support in a different position of self-adjustment which allows the lower edge of the automobile body to clear the pivotal connection between the two skid sections.
Figure 3:
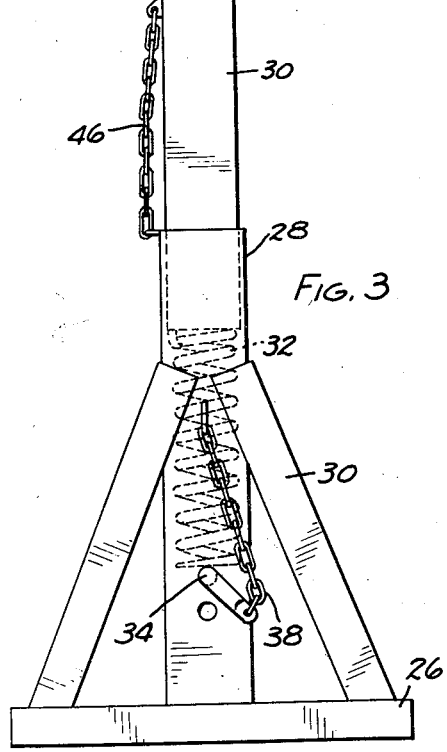
Fig. 3 is a side elevational view showing the skid support of this invention.
Figure 4:
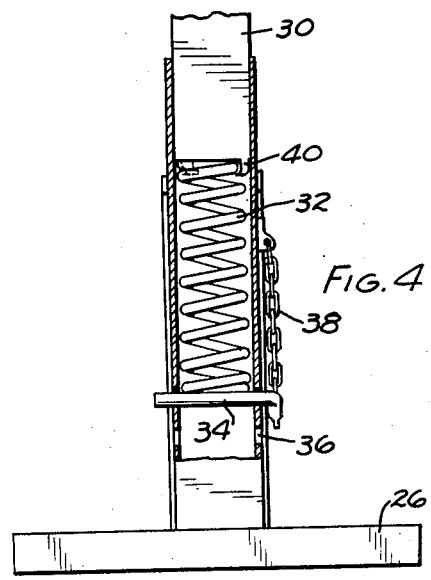
Fig. 4 is a view partly in section showing the internal construction of the skid support.

With the skid support of the construction described herein, it will be observed that the hinge assembly 22 between the two sections 18 and 20 is caused to raise and lower in accordance with the compression and expansion of spring 32. In the unloaded condition of skid sections 18 and 20, the spring 32 is expanded its fullest extent and therefore hinge 22 assumes its uppermost position. As soon as an automobile starts riding up the lower skid section 20, as illustrated in Fig. 1, the spring 32 starts to compress. This causes the skid sections 18 and 20 to pivot downwardly at hinge 22. The compression of spring 32 continues until the automobile reaches the position shown in Fig. 2, wherein the center of gravity of the automobile is approximately over the support 24. In this position of the automobile, the spring 32 is compressed a maximum amount and the hinge 22, together with the adjacent ends of the skid sections 18 and 20, are cleared by the lower edge of the automobile body. As the car continues to travel upwardly along the skid 16 beyond the position shown in Fig. 2, the load on support 24 is lessened and spring 32 starts to expand, thus raising the hinged end of skid section 18 and causing skid section 18 to assume a more nearly horizontal position. When the car reaches the position of the foremost car shown in the broken lines in Fig. 1, spring 32 has expanded sufficiently so that as the front wheels of the car travel down over the inclined track section 14, ample clearance is provided between this track section and the lower edge portion of the automobile body intermediate the wheels. It will also be appreciated that as the front wheels of an automobile travel upwardly along the lower section 20 of the skid, the inclination of the section 20 with respect to the horizontal becomes progressively less and thus a greater ground clearance is progressively provided at the rear end of the car. It will also be noted that if the weight of the car is less than that illustrated, the pin 34 might be adjusted to a lower position so as to obtain the necessary clearance in the position illustrated in Fig. 2.

Thus it will be seen that I have provided a skid support which automatically regulates itself in height to provide sufficient clearance to enable a car to travel freely up the skid and down into the motor car carrier without interference with either the ground, the skid, or the track on the motor car carrier.

I claim:

1. A device for loading automobiles on a motor car carrier having a track therein which inclines downwardly in a forward direction from the rear end of the carrier comprising, a pair of skids extending in an upwardly inclined direction from a ground surface to the rear ends of said track on the carrier, said skids each comprising a pair of longitudinally aligned sections which are hingedly connected at their adjacent ends for pivotal movement about a horizontal axis, and means resiliently supporting said pivotal connection of each skid in a position elevated from the ground surface, said support means being arranged to depress and elevate said pivotal connections in accordance with the vertical loading on said support means when an automobile is driven up said skid and on to said track.

2. The combination called for in claim 1 wherein said resilient support comprises a compression spring designed to maintain the upper skid sections in a generally horizontal position when the skids are not loaded with an automobile and to depress to a position wherein the upper and lower skid sections form a generally straight upwardly inclined track when a motor car is positioned centrally over said support means.

3. The combination set forth in claim 2 wherein said support means includes a pair of vertically extending, telescopically arranged support members having a spring arranged therebetween.

4. The combination called for in claim 1 wherein said support means includes a pair of vertically extensible members and a compression spring acting between said members.

5. The combination called for in claim 3 including means limiting the extent to which said support members are arranged to move relatively away from one another and also including means for adjustably limiting the extent to which said support members are arranged to telescope towards one another.

6. A self-regulating skid support for a motor car carrier comprising a base, an upright support mounted for vertical movement on said base, a vertically extending compression spring arranged between said base and said support and biasing said support vertically upwardly on said base, means for limiting the movement of said support on said base in an upwardly direction, a bracket on said base for supporting the lower end of said spring, means for adjusting said bracket vertically on said base to adjust the initial tension of said spring and thereby control the extent of downward movement of said upright support when it is subjected to a vertical load.

7. A device for loading automobiles on a motor car carrier having a track therein which inclines downwardly in a forward direction from the rear end of the carrier comprising a pair of skids extending in an upwardly inclined direction from a ground surface to the rear ends of said track on the carrier, said skids each comprising a pair of longitudinally aligned sections which are hingedly connected together at their adjacent ends for pivotal movement about a horizontal axis and means resiliently supporting the pivotal connection of each skid in a position elevated from the ground surface, said resilient supporting means comprising first and second upright members, the first member comprising a base adapted to form a ground support and the second member being movable vertically on said first member, a spring acting between said members and urging said second member upwardly on said first member, means limiting the movement of said second member on said first member in an upwardly direction and means for adjusting the initial tension of said spring to control the deflection of said pivotal connection in response to vertical loading thereof.

8. The combination called for in claim 7 wherein said spring comprises a vertically extending compression spring, the upper end of said spring being connected with said second member, a bracket on said first member supporting the lower end of said compression spring, said bracket being vertically adjustable on said first member.

References Cited in the file of this patent
UNITED STATES PATENTS

| | | |
|---|---|---|
| 1,673,740 | Eide | June 12, 1928 |
| 2,595,533 | Mullen et al. | May 6, 1952 |